United States Patent [19]

Rasmussen

[11] Patent Number: 5,399,439
[45] Date of Patent: Mar. 21, 1995

[54] BARBECUE ALUMINUM FOIL

[76] Inventor: Myron H. Rasmussen, 201 31st Ave. North, St. Cloud, Minn. 56303

[21] Appl. No.: 75,605

[22] Filed: Jun. 14, 1993

[51] Int. Cl.⁶ ............................................. A47J 37/06
[52] U.S. Cl. .................................. 428/596; 428/608; 126/25 R; 126/39 M; 99/450
[58] Field of Search ............... 428/596, 597, 607, 608; 126/39 M, 25 R, 332, 221; 99/444, 450

[56] References Cited

U.S. PATENT DOCUMENTS

| | | | |
|---|---|---|---|
| 3,211,082 | 10/1965 | Sachinoff et al. | 99/444 |
| 3,406,446 | 10/1968 | Muldovan | 428/608 |
| 3,555,994 | 1/1971 | Nemetz | 126/25 R |
| 3,717,083 | 2/1973 | Karapetian | 126/39 M |
| 4,186,217 | 1/1980 | Tchack | 99/450 |
| 4,240,398 | 12/1980 | Lindop | 126/25 R |
| 4,603,052 | 7/1986 | El-Hag et al. | 99/450 |
| 4,676,151 | 6/1987 | Gorsuch et al. | 99/450 |
| 4,763,639 | 8/1988 | Goldsworthy | 126/39 M |
| 4,885,989 | 12/1989 | Korpan | 126/25 R |
| 4,969,449 | 11/1990 | Levin | 126/39 M |

FOREIGN PATENT DOCUMENTS

| | | | |
|---|---|---|---|
| 867910 | 12/1941 | France | 99/450 |
| 2714051 | 10/1978 | Germany | 99/450 |
| 281707 | 3/1952 | Switzerland | 99/450 |

*Primary Examiner*—John Zimmerman
*Attorney, Agent, or Firm*—Leon Gilden

[57] ABSTRACT

A foil web is arranged for positioning over a barbecue grill structure to effect the dissipation of grease and the like to drip uniformly to underlying briquets and meter such grease in a manner to effect its dissipation and vaporization upon contact with an underlying heating structure. The web includes a matrix of apertures coextensive with the web of specific sizing to effect such dissipation.

2 Claims, 4 Drawing Sheets

BARBECUE ALUMINUM FOIL

BACKGROUND OF THE INVENTION

1. Field of the Invention

The field of invention relates to aluminum foil, and more particularly pertains to new and improved barbecue aluminum foil to effect the dissipation of grease during a barbecuing procedure.

2. Description of the Prior Art

Grill covers of various types have been utilized throughout the prior art wherein U.S. Pat. No. 4,969,449 sets forth a barbecue grill cover having a corrugated aluminum foil web including apertures directed therethrough.

U.S. Pat. No. 4,763,639 to Goldsworthy sets forth a disposable cover to an outdoor grill having rows of apertures in a staggered array directed therethrough.

The instant invention attempts to overcome deficiencies of the prior art by employing a foil member, wherein the flexible foil structure includes apertures of specific sizing as well as including reinforcing structure to effect the directing of grease through the apertures and in this respect, the present invention substantially fulfills this need.

SUMMARY OF THE INVENTION

In view of the foregoing disadvantages inherent in the known types of aluminum foil now present in the prior art, the present invention provides barbecue aluminum foil including an apertured flexible web arranged for mounting upon a barbecue grill to dissipate grease during a barbecuing procedure. As such, the general purpose of the present invention, which will be described subsequently in greater detail, is to provide new and improved barbecue aluminum foil which has all the advantages of the prior art aluminum foil and none of the disadvantages.

To attain this, the present invention provides a foil web arranged for positioning over a barbecue grill structure to effect the dissipation of grease and the like to drip uniformly to underlying briquets and meter such grease in a manner to effect its dissipation and vaporization upon contact with an underlying heating structure. The web includes a matrix of apertures coextensive with the web of specific sizing to effect such dissipation.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved barbecue aluminum foil which has all the advantages of the prior art aluminum foil and none of the disadvantages.

It is another object of the present invention to provide new and improved barbecue aluminum foil which may be easily and efficiently manufactured and marketed.

It is a further object of the present invention to provide new and improved barbecue aluminum foil which is of a durable and reliable construction.

An even further object of the present invention is to provide new and improved barbecue aluminum foil which is susceptible of a low cost of manufacture with regard to both materials and labor, and which accordingly is then susceptible of low prices of sale to the consuming public, thereby making such barbecue aluminum foil economically available to the buying public.

Still yet another object of the present invention is to provide new and improved barbecue aluminum foil which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
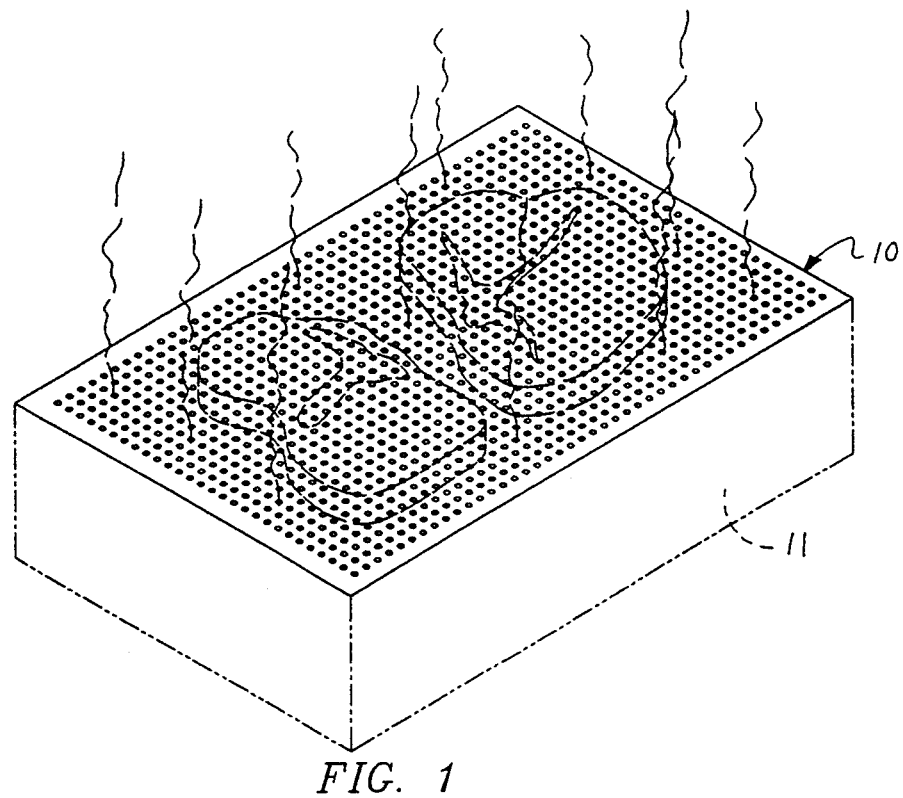
FIG. 1 is an isometric illustration of the invention in use.
Figure 2:
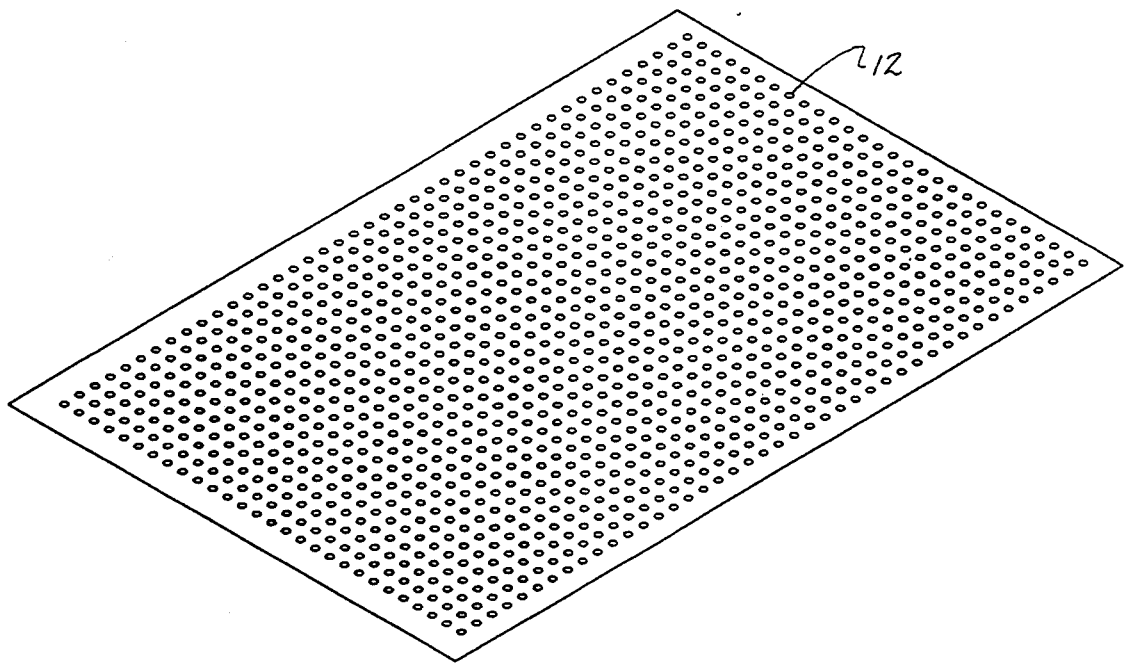
FIG. 2 is an isometric illustration of the web structure of the invention.
Figure 3:
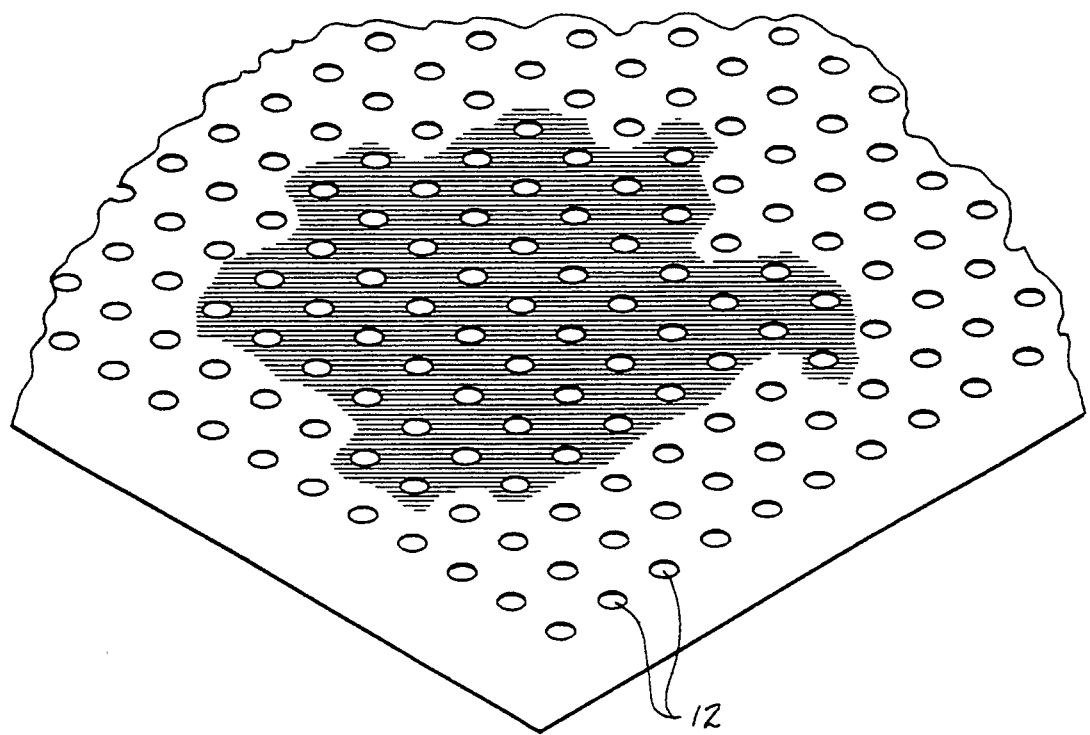
FIG. 3 is an enlarged isometric illustration of the invention.
Figure 4:
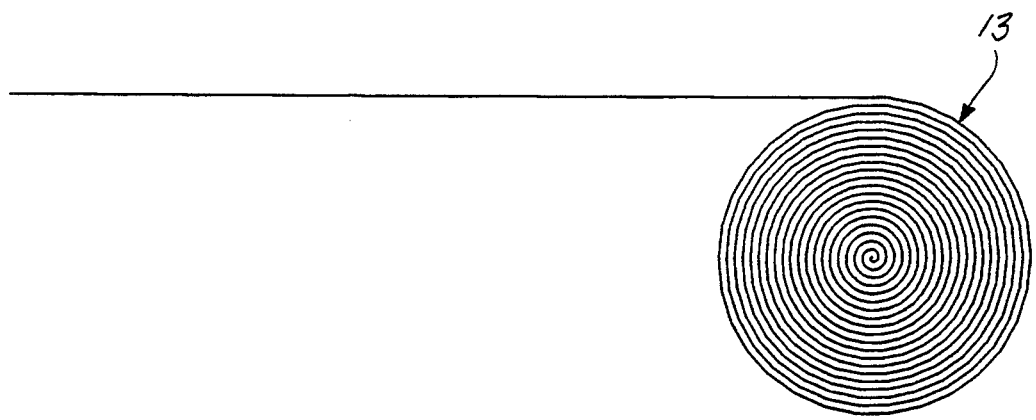
FIG. 4 is an orthographic side view of the foil in a rolled configuration.

With reference now to the drawings, and in particular to FIGS. 1 to 7 thereof, a new and improved barbecue aluminum foil embodying the principles and concepts of the present invention and generally designated by the reference numerals 10 and 10a will be described.

More specifically, the barbecue aluminum foil 10 of the instant invention is arranged for mounting upon a barbecue grill 11 during a barbecuing procedure, as indicated in FIG. 1. The foil structure includes a matrix of apertures 12 directed therethrough in rows and columns coextensive of the web, wherein each of the apertures is typically ⅛ inch in diameter. The ⅛ inch diameter apertured construction is optimally provided to effect the dispersion of grease without undue dripping and thereby enhance its atomization upon contact with underlying heating structure such as briquets, a barbecue heating grid such as gas, electric, and the like. The FIG. 4 indicates the structure arranged in a roll 13 for ease of storage and transport.

Figure 5:
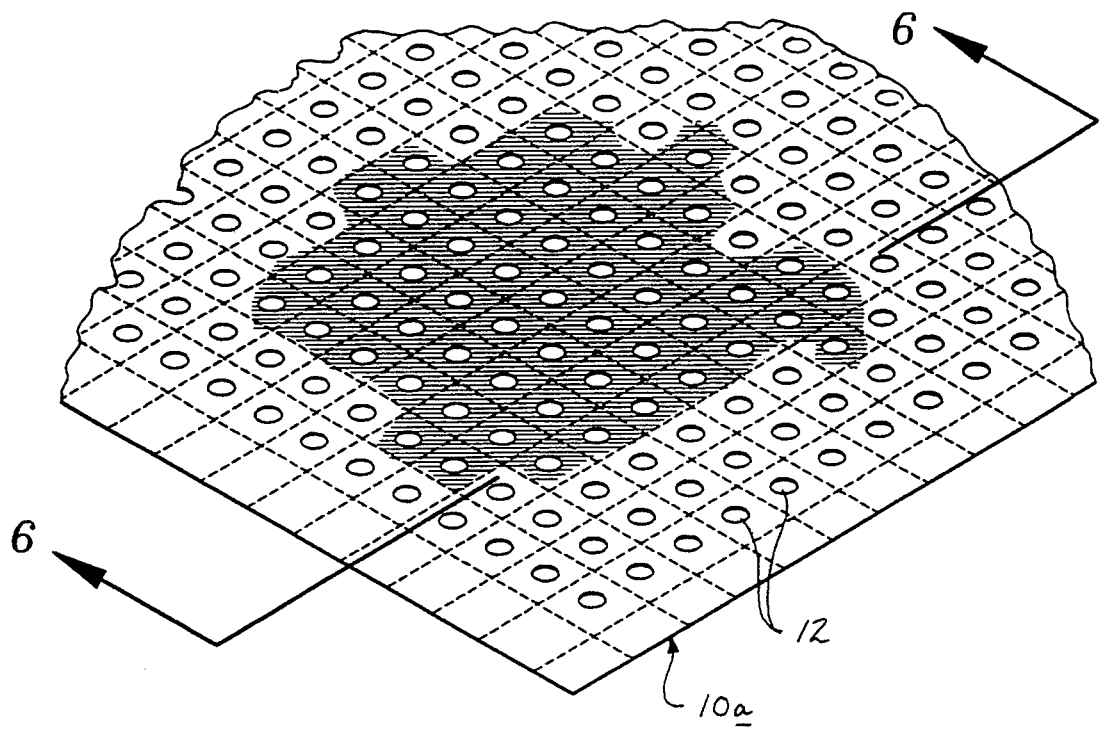
FIG. 5 is an isometric illustration of a modified web structure.
Figure 6:
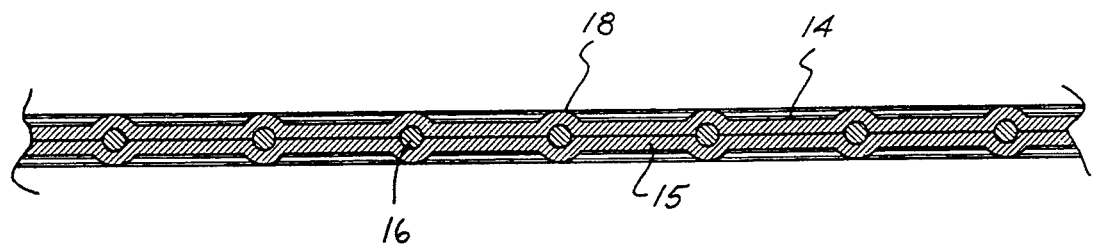
FIG. 6 is an orthographic view, taken along the lines 6—6 of FIG. 5 in the direction indicated by the arrows.
Figure 7:
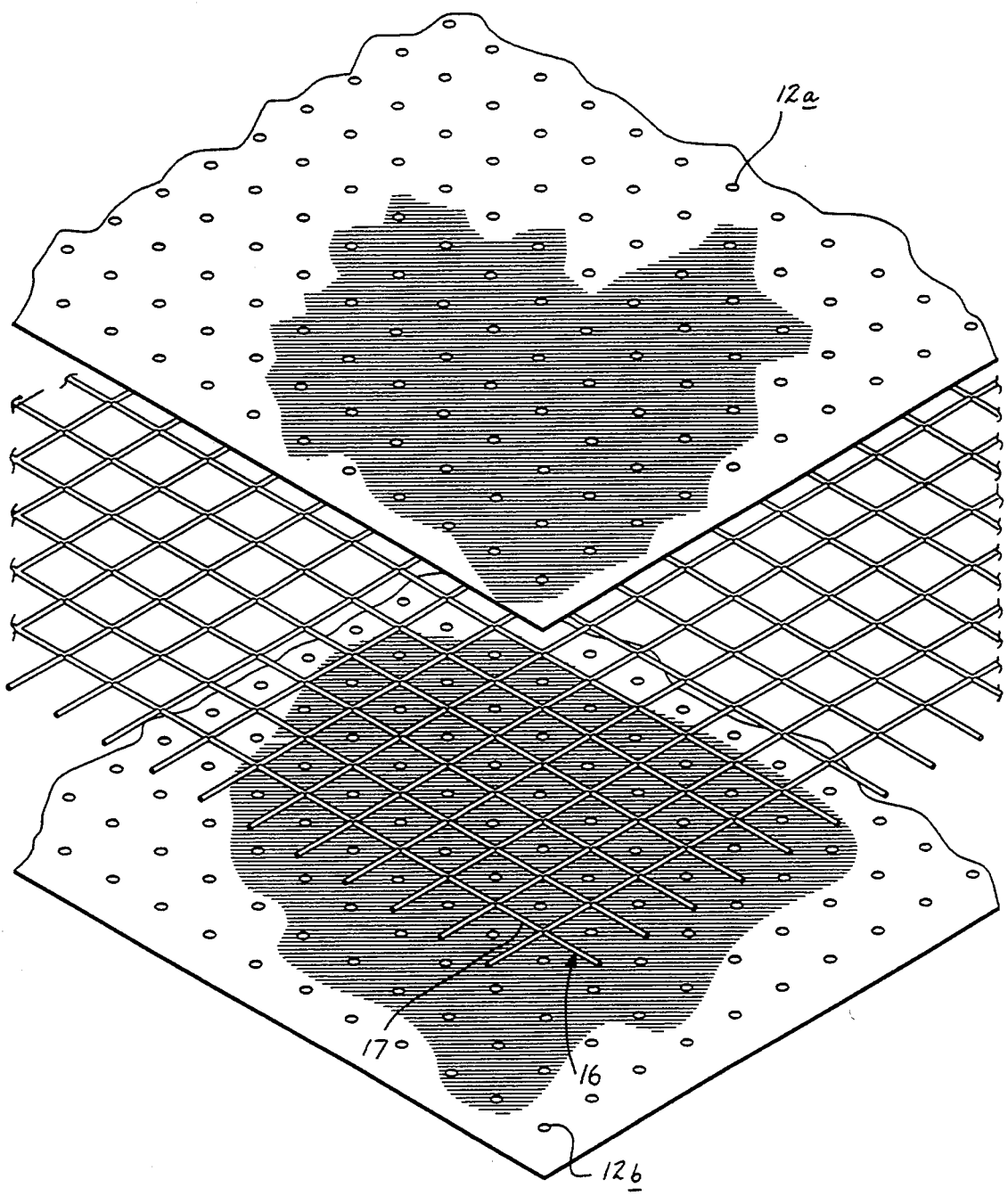
FIG. 7 is an exploded isometric illustration of the web structure, as indicated in FIG. 5.

The foil 10a, as indicated in FIG. 5, includes the apertures 12 directed therethrough, wherein the foil is of a web structure, having a top layer 14 coextensive with a bottom layer 15, with the top layer 14 having the apertures 12 indicated as top layer apertures 12a (see FIG. 7), with the bottom layer 15 having the bottom layer apertures 12b. When secured together, the top and bottom layer apertures 12a and 12b are aligned relative to one another to define individual apertures 12. Interposed between the top and bottom layers 14 and 15 respectively is a flexible reinforcing wire grid 16 defining a rectilinear frame 17 about each of the thusly formed apertures 12 to provide for a raised rib 18 surrounding each of the apertures 12 to direct a predetermined quantity of such grease into an individual of the apertures 12 to thereby enhance dispersion of such grease throughout the barbecue grill surface.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships; to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A barbecue aluminum foil, comprising, an aluminum foil web, the aluminum foil web including a matrix of apertures directed therethrough coextensive with the web, and the web includes a top layer coextensive with a bottom layer, the top layer including a matrix of top layer apertures, the bottom layer including a matrix of bottom layer apparatus, wherein each of the top layer apertures is aligned with one of said bottom layer apertures for alignment indicating an individual of said matrix of apertures, and a flexible reinforcing wire grid coextensive between the top layer and the bottom layer, wherein the wire grid defines a rectilinear frame about each of said matrix of apertures.

2. Aluminum foil as set forth in claim 1 wherein said rectilinear frame further defines a raised rib surrounding each of said individual of said matrix of apertures.

* * * * *